United States Patent
Verkaik et al.

(10) Patent No.: US 10,779,339 B2
(45) Date of Patent: *Sep. 15, 2020

(54) WIRELESS ROAMING USING A DISTRIBUTED STORE

(71) Applicant: Cisco Technology, Inc., San Jose, CA (US)

(72) Inventors: Patrick Douglas Verkaik, San Francisco, CA (US); Asa Daniel Zernik, San Francisco, CA (US); Jignesh Devji Patel, Fremont, CA (US); Nebojsa Milosavljevic, Berkeley, CA (US); Clifford A. Frey, San Francisco, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 209 days.

This patent is subject to a terminal disclaimer.

(21) Appl. No.: 15/945,430

(22) Filed: Apr. 4, 2018

(65) Prior Publication Data

US 2018/0227969 A1  Aug. 9, 2018

Related U.S. Application Data

(63) Continuation of application No. 14/591,737, filed on Jan. 7, 2015, now Pat. No. 9,967,906.

(51) Int. Cl.
*H04W 76/12* (2018.01)
*H04W 8/04* (2009.01)
(Continued)

(52) U.S. Cl.
CPC ........... *H04W 76/12* (2018.02); *H04L 12/189* (2013.01); *H04W 4/06* (2013.01); *H04W 8/04* (2013.01); *H04W 8/082* (2013.01)

(58) Field of Classification Search
CPC ............................. H04W 64/00; H04W 76/12
See application file for complete search history.

(56) References Cited

U.S. PATENT DOCUMENTS 4,236,068 A   11/1980  Walton
5,642,303 A   6/1997  Small et al.
(Continued)

FOREIGN PATENT DOCUMENTS

WO   WO 2013/020126   2/2013
WO   WO 2014/098556   6/2014
WO   WO 2018/009340   1/2018

OTHER PUBLICATIONS

Carter, Steve SR., "E911 VoIP Essentials for Enterprise Deployments," XO Communications, LLC, 2012, 9 pages.
(Continued)

*Primary Examiner* — Hoon J Chung
(74) *Attorney, Agent, or Firm* — Polsinelli PC

(57) ABSTRACT

Systems, methods, and computer-readable storage media for wireless roaming are disclosed. An access point receives a communication request from a wireless device and determines a home broadcast domain associated with the wireless device. The access point determines that the home broadcast domain is different than the broadcast domain associated with the access point and proceeds to identify a second access point that is associated with the home broadcast domain of the wireless device. The access point establishes a tunnel between the access point and the second access point for routing traffic associated with the wireless device.

20 Claims, 10 Drawing Sheets

(51) Int. Cl.
*H04L 12/18* (2006.01)
*H04W 4/06* (2009.01)
*H04W 8/08* (2009.01)

(56) References Cited

U.S. PATENT DOCUMENTS

| | | | |
|---|---|---|---|
| 5,751,223 A | 5/1998 | Turner | |
| 6,812,824 B1 | 11/2004 | Goldinger et al. | |
| D552,603 S | 10/2007 | Tierney | |
| 7,573,862 B2 | 8/2009 | Chambers et al. | |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Tóth et al. | |
| 8,396,485 B2 | 3/2013 | Grainger et al. | |
| 8,446,899 B2 | 5/2013 | Lei et al. | |
| 8,458,184 B2 | 6/2013 | Dorogusker et al. | |
| D691,636 S | 10/2013 | Bunton | |
| 8,549,638 B2 | 10/2013 | Aziz | |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,693,367 B2 | 4/2014 | Chowdhury et al. | |
| 8,718,644 B2 | 5/2014 | Thomas et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| D757,424 S | 5/2016 | Phillips et al. | |
| D759,639 S | 6/2016 | Moon et al. | |
| 9,389,992 B2 | 7/2016 | Gataullin et al. | |
| 9,426,305 B2 | 8/2016 | De Foy et al. | |
| D767,548 S | 9/2016 | Snyder et al. | |
| D776,634 S | 1/2017 | Lee et al. | |
| 9,544,337 B2 | 1/2017 | Eswara et al. | |
| 9,609,504 B2 | 3/2017 | Karlqvist et al. | |
| 9,642,167 B1 | 5/2017 | Snyder et al. | |
| 9,654,344 B2 | 5/2017 | Chan et al. | |
| 9,713,114 B2 | 7/2017 | Yu | |
| 9,772,927 B2 | 9/2017 | Gounares et al. | |
| 9,820,105 B2 | 11/2017 | Snyder et al. | |
| D804,450 S | 12/2017 | Speil et al. | |
| 9,858,559 B2 | 1/2018 | Raleigh et al. | |
| 9,860,151 B2 | 1/2018 | Ganichev et al. | |
| 9,933,224 B2 | 2/2018 | Dumitriu et al. | |
| 9,923,780 B2 | 3/2018 | Rao et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 2003/0087645 A1 | 5/2003 | Kim et al. | |
| 2003/0116634 A1 | 6/2003 | Tanaka | |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2009/0129389 A1 | 5/2009 | Halna DeFretay | |
| 2009/0203370 A1 | 8/2009 | Giles et al. | |
| 2009/0282048 A1 | 11/2009 | Ransom | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2010/0290465 A1* | 11/2010 | Ankaiah | H04L 12/4641 370/390 |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0086665 A1* | 4/2013 | Filippi | H04W 12/06 726/7 |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | A K et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | V.M. et al. | |
| 2014/0191868 A1 | 7/2014 | Ortiz et al. | |
| 2014/0198808 A1 | 7/2014 | Zhou | |
| 2014/0233460 A1 | 8/2014 | Pettus et al. | |
| 2014/0269321 A1 | 9/2014 | Kamble et al. | |
| 2014/0302869 A1 | 10/2014 | Rosenbaum et al. | |
| 2014/0337824 A1 | 11/2014 | St. John et al. | |
| 2014/0341568 A1 | 11/2014 | Zhang et al. | |
| 2015/0016286 A1 | 1/2015 | Ganichev et al. | |
| 2015/0016469 A1 | 1/2015 | Ganichev et al. | |
| 2015/0030024 A1 | 1/2015 | Venkataswami et al. | |
| 2015/0043581 A1 | 2/2015 | Devireddy et al. | |
| 2015/0063166 A1 | 3/2015 | Sif et al. | |
| 2015/0065161 A1 | 3/2015 | Ganesh et al. | |
| 2015/0085734 A1* | 3/2015 | Nagaraja | H04L 12/4633 370/312 |
| 2015/0087330 A1 | 3/2015 | Prechner et al. | |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |
| 2015/0223337 A1 | 8/2015 | Steinmacher-Burow | |
| 2015/0256972 A1 | 9/2015 | Markhovsky et al. | |
| 2015/0264519 A1 | 9/2015 | Mirzaei et al. | |

(56) References Cited

U.S. PATENT DOCUMENTS

| | | |
|---|---|---|
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0344641 A1 | 11/2016 | Javidi et al. |
| 2017/0026974 A1 | 1/2017 | Dey et al. |
| 2017/0214551 A1 | 7/2017 | Chan et al. |
| 2018/0069311 A1 | 3/2018 | Pallas et al. |
| 2018/0084389 A1 | 3/2018 | Snyder et al. |

OTHER PUBLICATIONS

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cisco Systems, Inc., "Wi-FI Location-Based Services 4.1 Design Guide," May 20, 2008, 206 pages.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012 ), pp. 101-108.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Afolabi, Ibrahim, et al., "Network Slicing & Softwarization: A Survey on Principles, Enabling Technologies & Solutions," Mar. 21, 2018, pp. 1-24.

Antonioli, Roberto, et al., "Dual Connectivity for LTE-NR Cellular Networks," Research Gate, Sep. 3-6, 2017, pp. 171-175.

Cisco ASR 5x00 Mobility Management Entity Administration Guide, Version 15.0, Last updated Jun. 13, 2014, Cisco, 1-266.

Cox, Jacob H. JR., et al., "Advancing Software-Defined Networks: A Survey," IEEE, Oct. 12, 2017, pp. 25487-25526.

Saraiva de Sousa, Nathan F., et al., "Network Service Orchestration: A Survey," IEEE Communications Surveys & Tutorials, Mar. 23, 2018, pp. 1-30.

Geller, Michael, et al. , "5G Security Innovation with Cisco," Whitepaper Cisco Public, Jun. 8, 2018, pp. 1-29.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

Leary et al., Wireless LAN Fundamentals: Mobility, Jan. 9, 2004, Cisco Press, 15 pages.

I Love WiFi, The difference between L2 and L3 Roaming Events, Apr. 1, 2010, 6 pages.

Network Heresy, NVGRE, VXLAN and What Microsoft is Doing Right, Oct. 3, 2011, 5 pages.

\* cited by examiner

600

WIRELESS ROAMING USING A DISTRIBUTED STORE

RELATED APPLICATIONS

The instant application is a continuation of U.S. patent application Ser. No. 14/591,737, filed on Jan. 7, 2015 entitled WIRELESS ROAMING USING A DISTRIBUTED STORE, the contents of which are expressly incorporated herein by reference in its entirety.

TECHNICAL FIELD

The present technology pertains to wireless roaming, and more specifically to roaming among wireless access points that is implemented using a distributed store.

BACKGROUND

Computer networks are frequently divided or extended to include logical segments in order to address security and scalability concerns. The various logical segments in the network often include wireless access points to allow devices to connect wirelessly to the network. Unfortunately, the logical segments generally prevent devices from roaming across segments without service interruption. In particular, when a device moves from one logical segment to another, the session is interrupted and the connection must be re-established. Accordingly, the benefits of wireless technologies, which allow users to move with some flexibility, are significantly limited in current networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
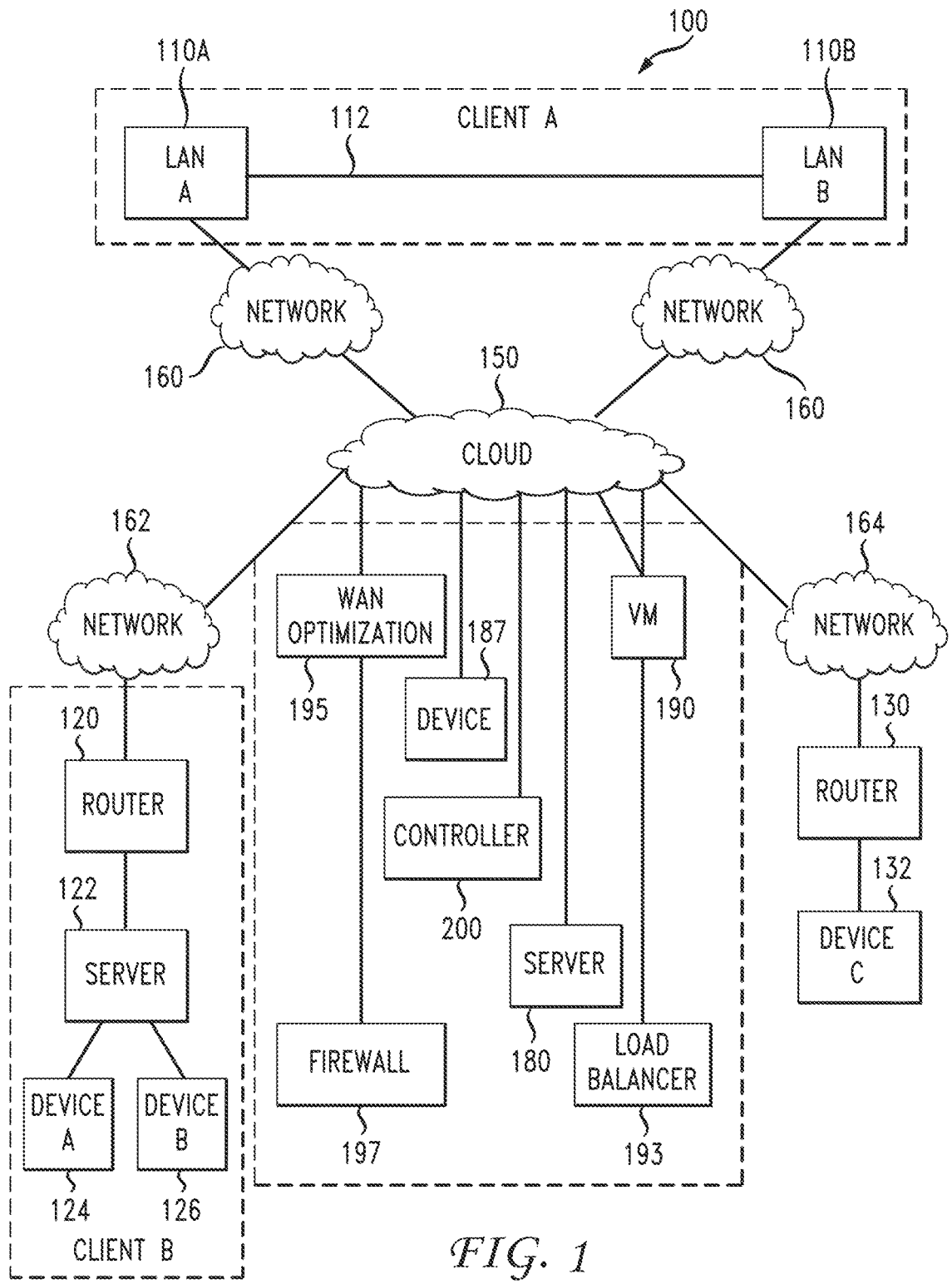
FIG. 1 illustrates a schematic block diagram of an example cloud architecture including nodes/devices interconnected by various methods of communication.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The subject technology provides embodiments for wireless roaming in a network. The method includes receiving a communication request from a wireless device at a first access point. The first access point can determine a home broadcast domain associated with the wireless device and it can also determine the broadcast domain associated with the first access point. Upon determining that the home broadcast domain associated with the device is different from the broadcast domain associated with the first access point, the first access point can identify a second access point that is associated with the same home broadcast domain as the device. The first access point can establish a tunnel between the first access point and the second access point for routing traffic associated with the device.

DETAILED DESCRIPTION

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Endpoint groups (EPGs) can also be used in a network for mapping applications to the network. In particular, EPGs can use a grouping of application endpoints in a network to apply connectivity and policy to the group of applications. EPGs can act as a container for groups or collections of applications, or application components, and tiers for implementing forwarding and policy logic. EPGs also allow separation of network policy, security, and forwarding from addressing by instead using logical application boundaries.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

The cloud may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. In some cases, the cloud can include one or more cloud controllers which can help manage and interconnect various elements in the cloud as well as tenants or clients connected to the cloud.

Cloud controllers and/or other cloud devices can be configured for cloud management. These devices can be pre-configured (i.e., come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

Figure 2:
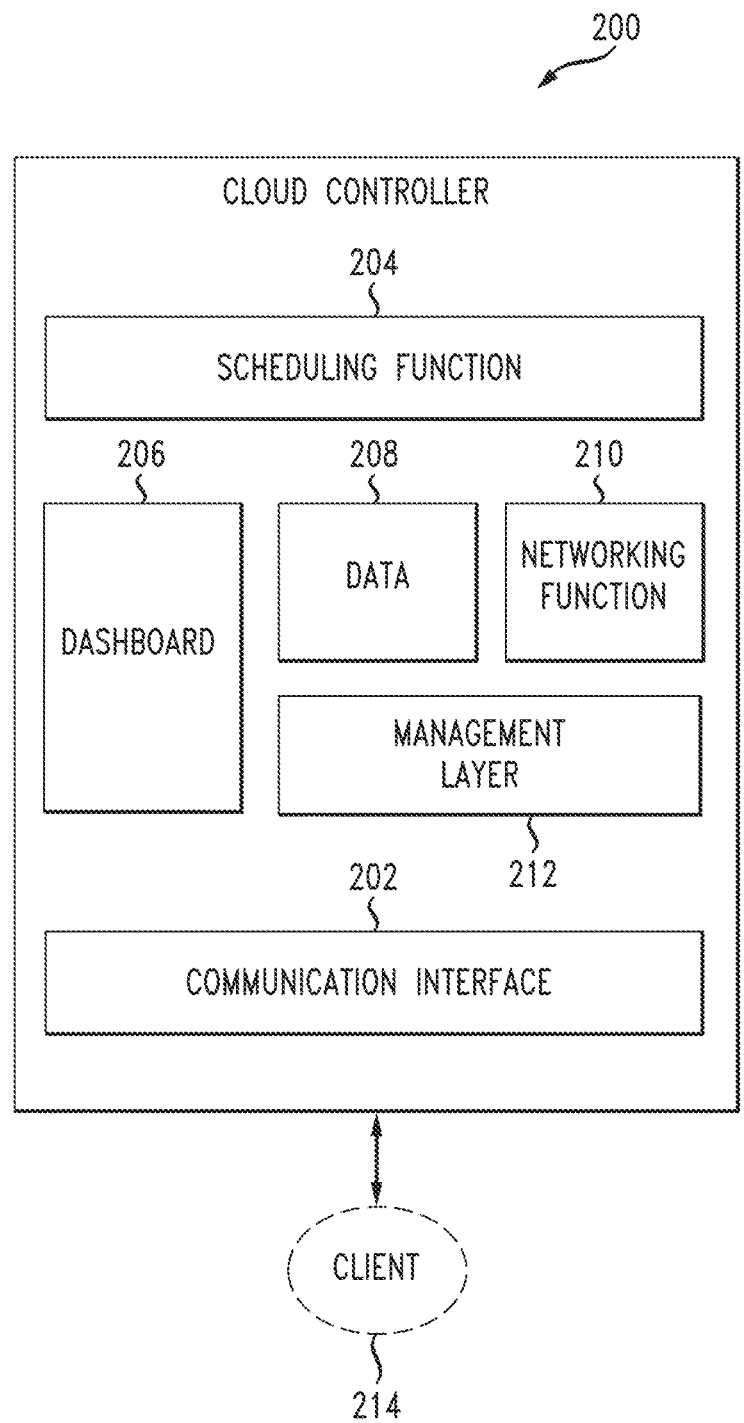
FIG. 2 illustrates a schematic block diagram of an example cloud service management system.
Figure 8:
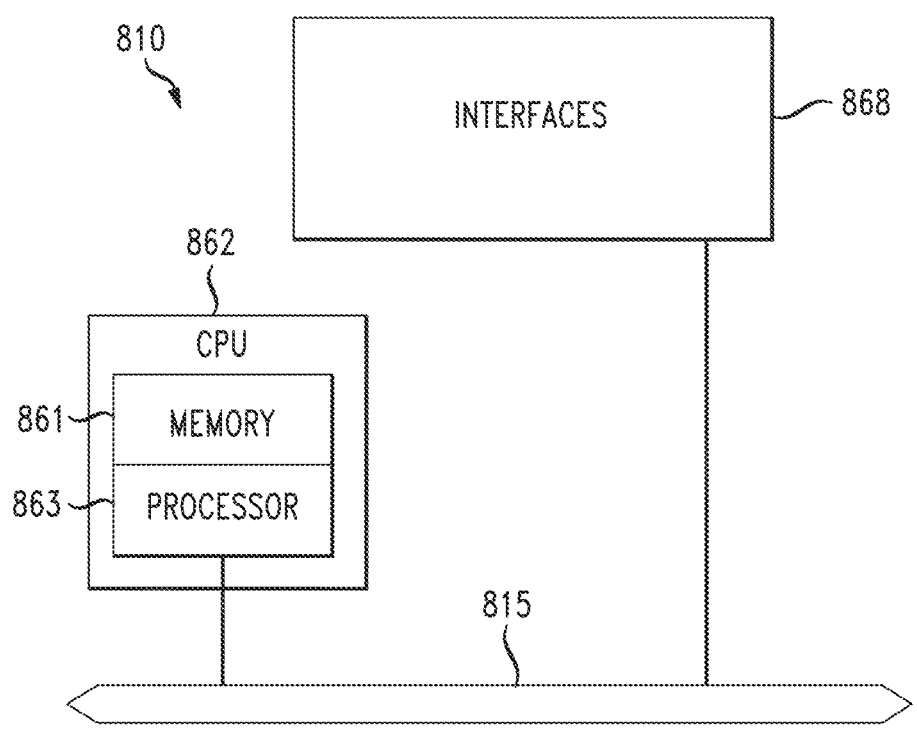
FIG. 8 illustrates an example network device.
Figure 9A:
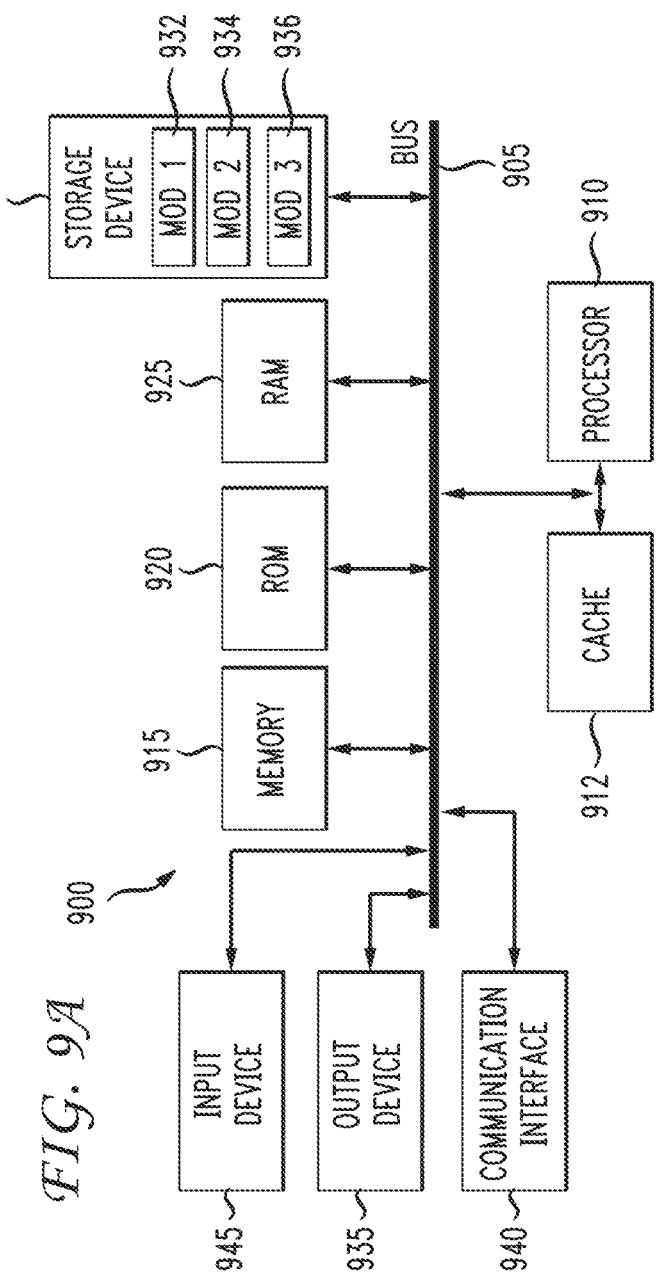
FIGS. 9A and 9B illustrate example system embodiments.
Figure 9B:
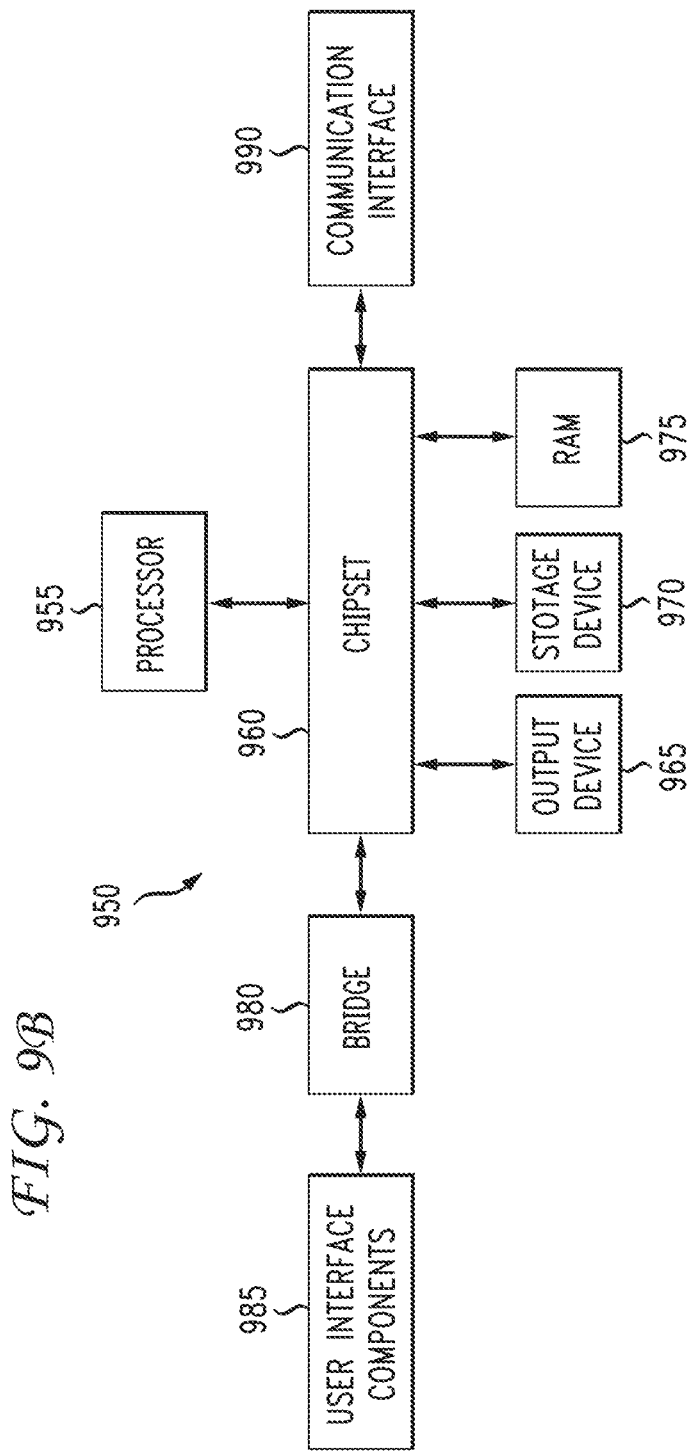

The disclosed technology addresses the need in the art for flexible, reliable, and transparent wireless roaming. Disclosed are systems, methods, and computer-readable storage media for wireless roaming across network segments. A description of cloud computing environments, as illustrated in FIGS. 1 and 2, is first disclosed herein. A discussion of wireless roaming and concepts related to a distributed store for storing data entries across devices will then follow, including examples and variations as illustrated in FIGS. 3-7. The discussion concludes with a brief description of example devices, as illustrated in FIGS. 8 and 9A-B. These variations shall be described herein as the various embodiments are set forth. The disclosure now turns to FIG. 1.

FIG. 1 illustrates a schematic block diagram of an example cloud architecture 100 including nodes/devices interconnected by various methods of communication. Cloud 150 can be a public, private, and/or hybrid cloud system. Cloud 150 can include resources, such as one or more Firewalls 197; Load Balancers 193; WAN optimization platforms 195; devices 187, such as switches, routers, intrusion detection systems, Auto VPN systems, or any hardware or software network device; servers 180, such as dynamic host configuration protocol (DHCP), domain naming system (DNS), or storage servers; virtual machines (VMs) 190; controllers 200, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 150 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide configuration services, such as auto VPN, automated deployments, automated wireless configurations, automated policy implementations, and so forth. In some cases, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage distributed store settings, as will be described below with reference to FIG. 6.

To further illustrate, cloud 150 can provide specific services for client A. For example, cloud 150 can handle traffic, deploy a network or specific network components, configure links or devices, automate services or functions, or provide any other services for client A. Other non-limiting example services by cloud 150 can include network administration services, network monitoring services, content filtering services, application control, WAN optimization, firewall services, gateway services, storage services, protocol configuration services, wireless deployment services, and so forth.

To this end, client A can connect with cloud 150 through network 160. More specifically, client A can connect with cloud 150 through network 160, in order to access resources from cloud 150, communicate with cloud 150, or receive any services from cloud 150. LAN A (110A) and/or LAN B (110B) of client A can connect with cloud 150 through network 160. Network 160 can refer to a public network, such as the Internet; a private network, such as a LAN; or any other network, such as a VPN or an overlay network. LAN A and LAN B can connect with each other directly via a wired and/or wireless connection, or indirectly via an intermediate network(s) or device(s). For example, LAN A and LAN B can connect through link 112. The link 112 can be a wired or wireless connection; a tunnel, such as a VPN or SSH tunnel; or any other connection.

In some cases, cloud 150 can maintain information about LAN A, LAN B, link 112, and/or any other devices from client A, in order to provide or support specific services for client A, such as distributed store configuration that can be used to enable wireless roaming among wireless access points. For example, cloud 150 can establish or maintain VLAN or broadcast domain (BD) configurations or settings for use in wireless roaming, or manage a distributed store containing VLAN or BD configurations or settings for wireless roaming. Cloud 150 can also maintain one or more links or tunnels to client A and/or any components in client A. For example, cloud 150 can maintain a VPN tunnel to one or more devices in LAN A and/or LAN B. In some cases, cloud 150 can configure the VPN tunnel for client A, maintain the VPN tunnel, or automatically update or establish any link or tunnel to client A or any devices in client A.

Cloud 150 can similarly provide one or more services to client B, as previously described with respect to client A. Client B can use router 120 to communicate with cloud 150 through network 162. Router 120 can connect to cloud 150 through network 162 in order to receive service(s), access data, send data, store data, extend client B's network, manage traffic or devices, etc. Like network 160, network 162 can include one or more networks, which can include a public network, a private network, or any other type of network(s).

Router 120 can connect to server 122, in order to connect server 122 to network 162, as well as cloud 150 and/or the Internet. Server 122 can include any type of server or server setup, such as a web server, a domain controller, a database server, a storage server, a media server, a RADIUS server, a DNS server, a DHCP server, a file server, a network management server, an email server, datacenter, a cluster of servers, etc. Moreover, server 122 can connect to device A (124) and device B (126), either directly or indirectly through one or more L2 or L3 devices, such as a switch, hub, or router. This way, server 122 can provide services to the devices A and B (124 and 126). Device A (124) and device B (126) can be any devices with processing and/or storage capability, such as personal computers, mobile phones (e.g., smartphones), gaming systems, portable computers (e.g., laptops, tablets, etc.), set-top boxes, smart televisions, vehicles, media players, networking devices, or any other device.

Router 130 and device C (132) can also connect to cloud 150 to receive one or more services, settings, or capabilities, as previously described. In particular, device C (132) can connect with router 130, which can connect to cloud 150 through network 164. Accordingly, device C (132) can communicate with cloud 150 through router 130 and network 164. Network 164 can include one or more networks, which can include a private network, a public network, or any other type of network(s). Moreover, device C (132) can be any device with processing capability, such as device A (124) or device B (126) previously described.

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or type of resources, which can be accessed and utilized by clients or tenants. The illustration and examples provided herein are for explanation purposes.

Moreover, as far as communications within the cloud architecture 100, packets (e.g., traffic and/or messages) can be exchanged among the various nodes and networks in the cloud architecture 100 using specific network communication protocols. In particular, packets can be exchanged using wired protocols, wireless protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc., can be implemented to facilitate communications.

FIG. 2 illustrates a schematic block diagram of an example cloud controller 200. The cloud controller 200 can serve as a cloud service management system for the cloud 150. In particular, the cloud controller 200 can manage cloud operations, client communications, service provisioning, network configuration and monitoring, etc. For example, the cloud controller 200 can manage cloud service provisioning, such as cloud storage, media, streaming, security, or administration services. In some embodiments, the cloud controller 200 can manage or configure a distributed store to facilitate wireless roaming, as described in the FIGs. below.

For example, the cloud controller 200 can analyze a network and designate the network nodes that will host the distributed store. The cloud controller 200 can propagate the information about the distributed store throughout the network to facilitate access to the information stored on the designated nodes. The cloud controller 200 can monitor the network and update the distributed store settings as required. Additional details regarding the operation of the cloud controller 200 with respect to the distributed store are set forth in the description of FIG. 6.

The cloud controller 200 can include several subcomponents, such as a scheduling function 204, a dashboard 206, data 208, a networking function 210, a management layer 212, and a communications interface 202. The various subcomponents can be implemented as hardware and/or software components. Moreover, although FIG. 2 illustrates one example configuration of the various components of the cloud controller 200, those of skill in the art will understand that the components can be configured in a number of different ways and can include any other type and number of components. For example, the networking function 210 and management layer 212 can belong to one software module or multiple separate modules. Other modules can be combined or further divided up into more subcomponents.

The scheduling function 204 can manage scheduling of procedures, events, or communications. For example, the scheduling function 204 can schedule when resources should be allocated from the cloud 150. As another example, the scheduling function 204 can schedule when specific instructions or commands should be transmitted to the client 214. In some cases, the scheduling function 204 can provide scheduling for operations performed or executed by the various subcomponents of the cloud controller 200. The scheduling function 204 can also schedule resource slots, virtual machines, bandwidth, device activity, status changes, nodes, updates, etc.

The dashboard 206 can provide a frontend where clients can access or consume cloud services. For example, the dashboard 206 can provide a web-based frontend where clients can configure client devices or networks that are cloud-managed, provide client preferences, specify policies, enter data, upload statistics, configure interactions or operations, etc. In some cases, the dashboard 206 can provide visibility information, such as views of client networks or devices. For example, the dashboard 206 can provide a view of the status or conditions of the client's network, the operations taking place, services, performance, a topology or layout, specific network devices, protocols implemented, running processes, errors, notifications, alerts, network structure, ongoing communications, data analysis, etc.

Indeed, the dashboard 206 can provide a graphical user interface (GUI) for the client 214 to monitor the client network, the devices, statistics, errors, notifications, etc., and even make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In some cases, the dashboard 206 can also handle user or client requests. For example, the client 214 can enter a service request through the dashboard 206.

The data 208 can include any data or information, such as management data, statistics, settings, preferences, profile data, logs, notifications, attributes, configuration parameters, client information, network information, and so forth. For example, the cloud controller 200 can collect network statistics from the client 214 and store the statistics as part of the data 208. In some cases, the data 208 can include performance and/or configuration information. This way, the cloud controller 200 can use the data 208 to perform management or service operations for the client 214. The data 208 can be stored on a storage or memory device on the cloud controller 200, a separate storage device connected to the cloud controller 200, or a remote storage device in communication with the cloud controller 200.

The networking function 210 can perform networking calculations, such as network addressing, or networking service or operations, such as auto VPN configuration or traffic routing. For example, the networking function 210 can perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the networking function 210 can handle networking requests from other networks or devices and establish links between devices. In other embodiments, the networking function 210 can perform queueing, messaging, or protocol operations.

The management layer 212 can include logic to perform management operations. For example, the management layer 212 can include the logic to allow the various components of the cloud controller 200 to interface and work together. The management layer 212 can also include the logic, functions, software, and procedure to allow the cloud controller 200 perform monitoring, management, control, and administration operations of other devices, the cloud 150, the client 214, applications in the cloud 150, services provided to the client 214, or any other component or procedure. The management layer 212 can include the logic to operate the cloud controller 200 and perform particular services configured on the cloud controller 200.

Moreover, the management layer 212 can initiate, enable, or launch other instances in the cloud controller 200 and/or the cloud 150. In some embodiments, the management layer 212 can also provide authentication and security services for the cloud 150, the client 214, the controller 214, and/or any other device or component. Further, the management layer 212 can manage nodes, resources, VMs, settings, policies, protocols, communications, etc. In some embodiments, the management layer 212 and the networking function 210 can be part of the same module. However, in other embodiments, the management layer 212 and networking function 210 can be separate layers and/or modules.

The communications interface 202 allows the cloud controller 200 to communicate with the client 214, as well as any other device or network. The communications interface 202 can be a network interface card (NIC), and can include wired and/or wireless capabilities. The communications interface 202 allows the cloud controller 200 to send and receive data from other devices and networks. In some embodiments, the cloud controller 200 can include multiple communications interfaces for redundancy or failover. For example, the cloud controller 200 can include dual NICs for connection redundancy.

Figure 3:
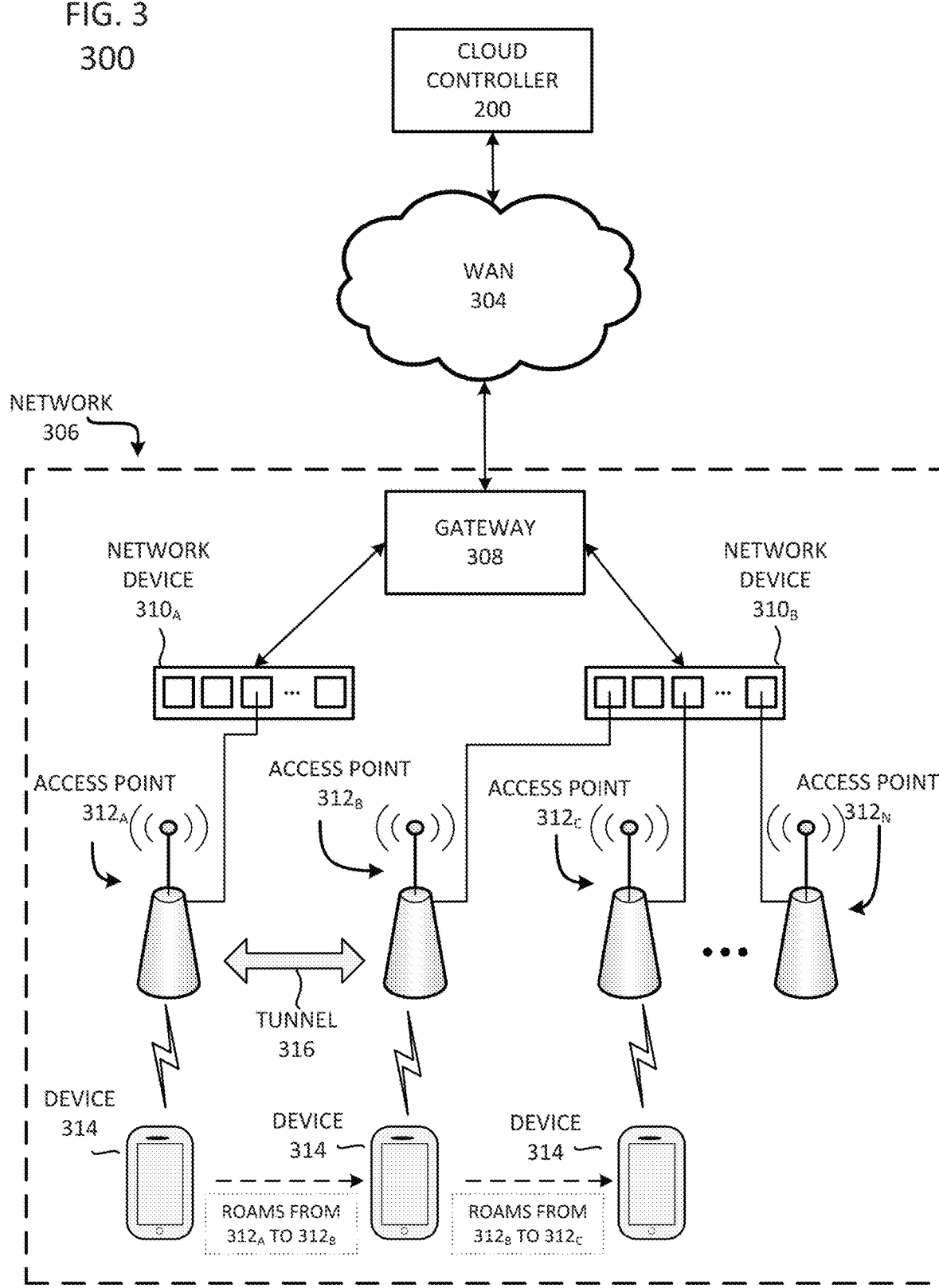
FIG. 3 illustrates an example system for implementing wireless roaming.

FIG. 3 illustrates an example system 300 used to implement wireless roaming. The system 300 can include a network 306 connected to a Wide Area Network (WAN) 304 such as the Internet. In some embodiments, network 306 may be a private network that can include one or more local area networks (LANs), VLANs, etc. As one of ordinary skill in the art will readily recognize, network 306 can also or otherwise be connected to any other public or private network in other embodiments. However, WAN 304 is used as a non-limiting example for the sake of clarity.

The network 306 can include one or more devices such as device 314. Device 314 can include, for example, a client or host device such as a personal computer or terminal, desktop, laptop, tablet, mobile phone, wireless media player, gaming system, etc. For simplicity, network 306 includes a single device 314, but one skilled in the art will recognize that network 306 can include any number of devices.

In addition, network 306 can include access points (APs) $312_A$, $312_B$, $312_C$ ... $312_N$ (collectively 312). APs 312 can provide wireless network access to device 314. APs 312 can be connected to network devices $310_A$ and $310_B$ (collectively 310). The network devices 310 can include L2 and/or L3 devices, such as switches or routers, for example. Those skilled in the art will recognize that the present technology is not limited to a particular network configuration or size.

In network 306, AP $312_A$ can send and receive network traffic via network device $310_A$. Similarly, AP $312_B$ and AP $312_C$ can send and receive network traffic via network device $310_B$. Network devices 310 can connect to Gateway 308. Gateway 308 can be a node such as a router that provides access to network 306. For example, Gateway 308 can connect to one or more Internet Service Providers (ISPs) to allow network 306 to access WAN 304, i.e. the Internet. In addition, a cloud controller 200 can access network 306 by way of WAN 304 and be used to perform a number of network management operations for network 306, as described above with respect to FIG. 2 and as described further herein.

Device 314 can include a wireless transceiver that is capable of communicating with APs 312. When device 314 is located within the signal range of AP $312_A$, it can establish a communication session and become associated with AP $312_A$. In some embodiments, device 314 can provide particular credentials before it can become associated with AP $312_A$. For example, the Media Access Control (MAC) address of device 314 can be used to determine if device 314 is allowed access to network 306. Alternatively, Remote Authentication Dial in User Service (RADIUS) can be used to determine if device 314 is allowed access to network 306. Authentication may require the user of device 314 to enter a particular password before device 314 can access network 306. In some cases, one or more of the APs 312 can be part of a wireless network, which can include an SSID (service set identifier). Thus, device 314 can join the wireless network using the SSID and/or any other credentials.

Upon successful association, device 314 can gain access to network 306, and can obtain network or data services via access point $312_A$. Network and data services can include internet web browsing, gaming, voice over internet protocol (VOIP), instant messaging, video streaming, video conferencing, computing resources, file sharing, etc. The network and data services can be provided to device 314 according to an address, such as an internet protocol (IP) address, associated with device 314. The IP address of device 314 can be assigned as a static IP address or it can be assigned dynamically according to the Dynamic Host Configuration Protocol (DHCP).

The association of device 314 to a particular access point such as AP $312_A$ can also be used to determine a home broadcast domain for device 314. The home broadcast domain is the broadcast domain that device 314 is physically or logically connected to. In one embodiment, the home broadcast domain can be based on a group policy that assigns a VLAN tag to device 314 by using a particular network protocol such as RADIUS. Alternatively, the home broadcast domain can be based on the native VLAN or the default VLAN of the AP that a device initially connects to—i.e. the home broadcast domain for device 314 can be the native VLAN of AP $312_A$.

For ease of explanation, we can assume that the home broadcast domain of device 314 is the native VLAN of AP $312_A$. For example, we can assume that AP $312_A$ has a native VLAN that is equivalent to VLAN 1. Hence, in this example, the home broadcast domain of device 314 is VLAN 1. Traffic can then be routed to device 314 through its home broadcast domain, which is associated with VLAN 1, while device 314 remains associated with AP $312_A$.

As illustrated in FIG. 3, device 314 has the ability to roam within network 306 and connect to different APs 312. For example, device 314 can roam from AP $312_A$ to AP $312_B$ after it has become associated with AP $312_A$. If AP $312_B$ is also on VLAN 1, device 314 can be reached via the same IP address, as device 314 remains logically connected to the home broadcast domain.

Alternatively, APs 312 can be configured to connect to different VLANs. For example, AP $312_B$ can be configured to connect to VLAN 2, which can correspond to a different VLAN than VLAN 1 for AP $312_A$. In this case, when device 314 roams from AP $312_A$ to AP $312_B$, AP $312_B$ can tunnel traffic associated with device 314 to AP $312_A$. This way, device 314 can maintain its connection to its home broadcast domain (VLAN 1) and avoid interruption in services. By maintaining its connection to its home broadcast domain, device 314 can also maintain its IP address. Thus, data routed to device 314 based on its IP address can be delivered to device 314 by way of the tunnel 316 that links device 314 back to its original home broadcast domain.

As explained in further detail with respect to FIG. 4 below, AP 312$_B$ can determine that device 314 is roaming from a home broadcast domain that is different than its own. Accordingly, AP 312$_B$ can identify and/or select an AP that is connected to the home broadcast domain associated with device 314, and use the selected AP as an anchor AP for traffic to/from device 314. An anchor AP can refer to any AP connected to the home broadcast domain of the device 314, which can be used to maintain the logical connection between the device 314 and the home broadcast domain. Thus, once AP 312$_B$ identifies an appropriate anchor AP, it can create a tunnel 316 between AP 312$_B$ and the anchor AP, and route traffic through the tunnel 316. This allows device 314 to remain logically connected to its home broadcast domain even when it roams and connects to another AP that is connected to a different broadcast domain. In some embodiments, the tunnel 316 can be a layer 2 protocol tunnel or a virtual private network tunnel.

In FIG. 3, AP 312$_B$ determines that device 314 has roamed from an AP that is on VLAN 1 and it creates tunnel 316 between itself (AP 312$_B$) and AP 312$_A$ which is on VLAN 1. Device 314 is then associated with AP 312$_B$, the host AP, and its traffic can be tunneled to/from AP 312$_A$, the anchor AP. Accordingly, device 314 can roam among APs that are on different broadcast domains and can maintain its connection to its home broadcast domains and can also maintain its IP address. Note that the tunnel 316 from AP 312$_B$ could be made to any of APs 312 that are within the desired home broadcast domain and are thus able to serve as an anchor AP.

As further illustrated in FIG. 3, device 314 can continue to roam from AP 312$_B$ to AP 312$_C$. Once again, AP 312$_C$ can determine that device 314 is roaming and is associated with a particular home broadcast domain. If AP 312$_C$ determines that device 314 and AP 312$_C$ are on the same broadcast domain (both devices are connected to the same VLAN 1), then AP 312$_C$ does not need to identify another AP to act as the anchor AP because its home broadcast domain matches that of device 314. Thus, device 314 can remain connected to its home broadcast domain through AP 312$_C$. Hence, AP 312$_C$ becomes both the host AP and the anchor AP for device 314. On the other hand, in other cases, if AP 312$_C$ determines that device 314 and AP 312$_C$ are on different broadcast domains, then AP 312$_C$ can identify an anchor AP and create a tunnel with the identified anchor AP to maintain a connection between device 314 and its home broadcast domain. Here, the anchor AP can be AP 312$_A$ or any other AP on the home broadcast domain.

Figure 4:
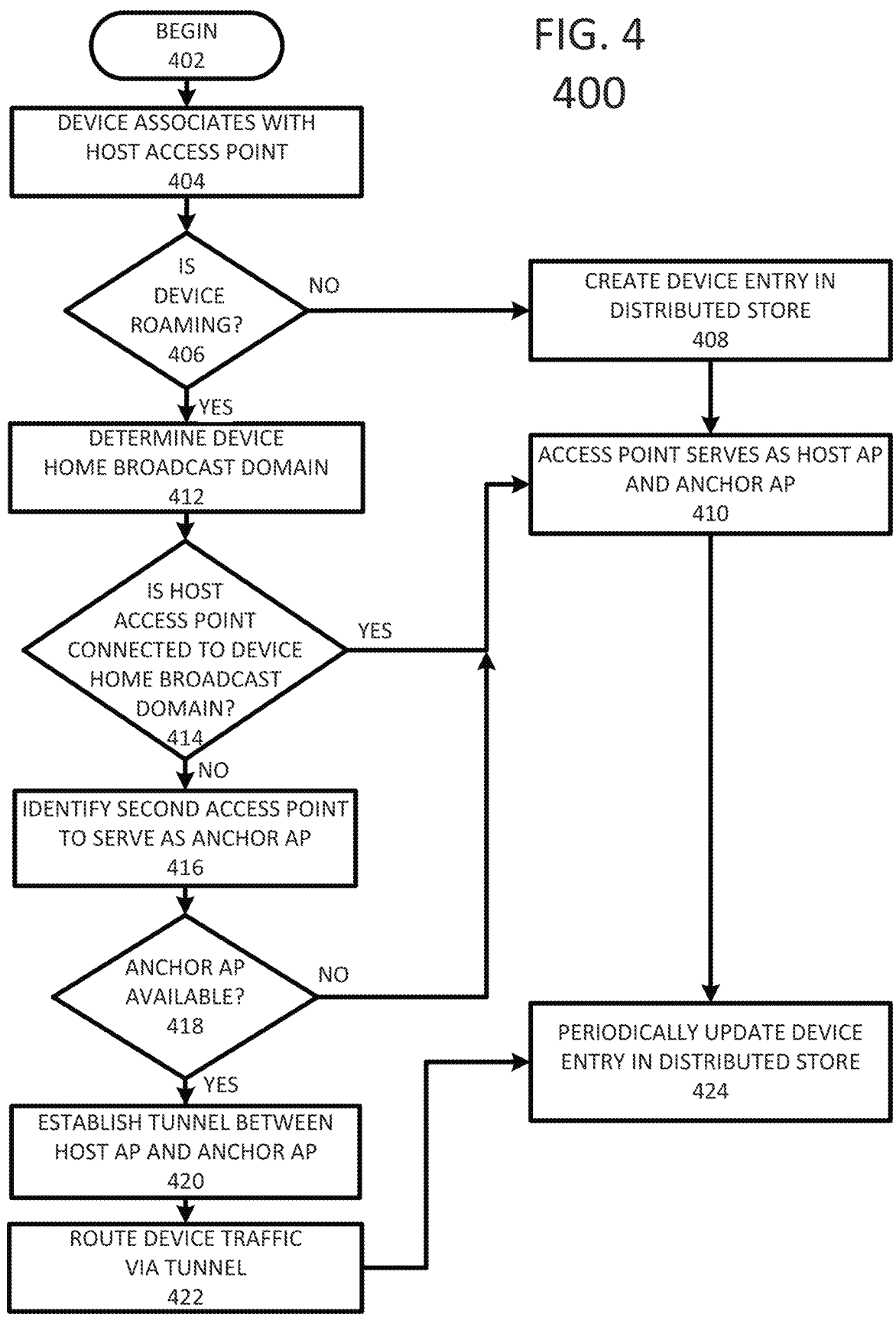
FIG. 4 illustrates an example method for wireless roaming using a distributed store.

FIG. 4 illustrates an example method 400 for wireless roaming. The method 400 begins at step 402 and proceeds to step 404 where a device associates with an access point (AP) such as AP 312$_N$. The AP that is in direct communication with the device is the host AP. Upon association, the method proceeds to step 406 to determine whether the device is roaming to the host AP from another AP.

To determine whether the device is roaming, the host AP can read information from a storage or memory location. In some embodiments, the host AP can read information from a distributed store. The distributed store can be hosted on multiple devices. For example, the distributed store can save data across nodes in the network. In one embodiment, the distributed store is saved on a designated subset of APs in the network. The distributed store can include data entries, such as key and value, which can identify devices that are presently associated with an AP in the network. For example, the distributed store can include the MAC address of the device along with a set of APs that are in the device's home broadcast domain. The device data can be initially written to the distributed store by the AP that handles its initial association and serves as both the host AP and the anchor AP.

The data saved in the distributed store can expire if it is not refreshed periodically. Therefore, when a device associates with a host AP, the distributed store may not have any record of that device if it is the device's initial association or if the device has been unassociated for a period of time that exceeds the required data refresh rate. Accordingly, the host AP can determine that the device is not roaming if there is no record of the device in the distributed store. That is, the host AP can issue a read request to the distributed store based on the device's MAC address. If there is no entry available for the device's MAC address, the distributed store can respond to let the AP know that no entry is available for that device. Alternatively, the AP may conclude that no data is available in the distributed store if it does not receive a response from the distributed store within a certain time. If the distributed store does not have record of the device, the AP can conclude that the device is not roaming. Alternatively, if the distributed store returns a record indicating that the device was associated with a different virtual access point (i.e. the device is changing SSID), the AP can again conclude that the device is not roaming. If the AP determines that the device is not roaming, the method proceeds to step 408 where the host AP creates an entry for the device in the distributed store.

As mentioned above, the entry in the distributed store can consist of the device's MAC address and of a set of APs that are in the device's home broadcast domain. The APs identified by the entry can then be used as anchor APs when the device roams to ensure the device remains logically connected to its home broadcast domain. The host AP can identify other APs in its same home broadcast domain by performing broadcast domain discovery. For example, it is possible for an AP on an access port to be connected to a VLAN that is numbered differently on another AP but is actually part of the same broadcast domain. On the other hand, two APs may be connected to VLANs that have the same VLAN number but are actually different VLANs. Thus, VLANs can be numbered differently on different APs. Accordingly, broadcast domain discovery allows an AP to create equivalence classes among APs. The AP can therefore identify which APs are connected to the same VLAN even if different numbering is used.

To perform broadcast domain discovery, the AP can periodically broadcast a broadcast domain announcement packet that contains the AP's VLAN ID (VID) for that particular broadcast domain. Thus, the packet identifies the "sender AP" and the corresponding VID. When an AP receives a broadcast domain announcement packet, it can create equivalence classes based on the (AP, VID) pairs it observes in the particular broadcast domain used to receive the packet. For example, AP1 can receive a first packet on VID1 that identifies (AP2, VID2) and a second packet that identifies (AP3, VID3). Thus, AP1 can create an equivalence class based on observed (AP, VID) pairs between itself, AP2 and AP3, as follows: (AP1, 1)=(AP2, 2)=(AP3, 3).

Broadcast domain discovery allows each AP to gather the (AP, VID) pairs that currently make up the broadcast domain. Broadcast domain announcement packets can be sent to all VLANs (i.e. 4,095) potentially attached to an AP or to some subset thereof. In some embodiments, the number of broadcast domain announcement packets can be limited to minimize network load and bandwidth usage. For example, the AP may be configured to send announcement packets only to its native VLAN. Alternatively, the AP may select VLANs that appear in a particular routing policy to send the announcement packets, or it may send them to any VLAN that it has received announcement packets from.

Having used broadcast domain discovery to gather the (AP, VID) pairs in the device's home broadcast domain, the host AP can create the device entry in the distributed store. The entry can include an identifying set consisting of a number of the smallest (AP, VID) pairs in the broadcast domain. In one example, an AP can be represented by its IP address and (AP1, VID1) can be defined as smaller than (AP2, VID2) if AP1<AP2. In the event the IP addresses of the two APs are the same, the comparison can be made according to the VID. For instance, (AP1, VID1) can be defined as smaller than (AP2, VID2) if AP1=AP2 and VID1<VID2. In some embodiments, the identifying set can include the three smallest pairs in the broadcast domain.

The entry can also include a candidate anchor set that identifies a number of (AP, VID) pairs that are randomly chosen from the same broadcast domain. In one embodiment, the candidate anchor set can include an identifier of the host itself among the candidate anchor set. The randomization of the candidate anchor set can provide better load distribution among anchor APs. For example, if two APs create distributed store entries for two devices that are on the same broadcast domain, the candidate anchor set for each of those devices will be selected randomly and will have one or more different pairs included in the set. In addition, the entry in the distributed store can also include the virtual access point (VAP) or the SSID that the device is associated with. The entry in the distributed store can also include a timestamp that indicates when the entry was saved. One that is skilled in the art will recognize that the distributed store can be used to save any other pertinent information about the device configuration, device settings, access point, network, etc.

After the host AP creates the entry in the distributed store, the method proceeds to step 410 where the AP serves as both the host AP and the anchor AP. That is, data from the device is routed in a traditional manner, directly through the AP without the need of any tunnel to another AP. As mentioned above, the data in the distributed store can expire if it is not refreshed. Thus, in step 424, the host AP can periodically refresh the distributed store entry while it continues to serve as host AP to the device.

Returning to step 406, if the host AP determines that the device is roaming, the method proceeds to step 412 where the AP determines the device's home broadcast domain. The AP can determine the device's home broadcast domain based on the data it receives from the distributed store. As discussed above, the distributed store can include one or more sets of (AP, VID) pairs that identify the device's home broadcast domain. The AP can read the identifying set of pairs from the distributed store and compare one or more of the sets to the locally stored broadcast domain equivalence classes that the AP has determined based on broadcast domain discovery. Alternatively, the AP can read the device's candidate set of pairs from the distributed store and compare one or more of the sets to the locally stored broadcast domain equivalence classes that the AP has determined based on broadcast domain discovery. In some embodiments, an AP may check more than one pair from the identifying set or the candidate anchor set to provide redundancy in the event an AP has joined or left a broadcast domain. At step 414, if the AP determines that it is connected to the device's home broadcast domain, the method proceeds to step 410 where the AP will once again serve as both host and anchor for the device. For example, if the distributed store provides (AP2, 2) as one of the identifying pairs, and the host AP determines that (AP2, 2) is equivalent to its (AP1, 1), then the AP can route data directly to the device because it is on the same home broadcast domain.

Alternatively, if the host AP determines, based on the identifying set or the candidate anchor set obtained from the distributed store, that it is not in the same home broadcast domain as the roaming device, then the method proceeds to step 416 to identify a second access point to serve as anchor AP for the device. The host AP can randomly select a tentative anchor AP from the candidate anchor set obtained from the distributed store. Alternatively, the host AP can select a tentative anchor AP based on a pre-defined priority, network usage, physical proximity to the host AP, etc. The host AP can send a message to the tentative anchor AP requesting to set it as the anchor. In some embodiments, the host AP can also send messages to the other APs in the candidate anchor set to check their respective status while it waits for a response from the tentative anchor AP.

At step 418, the host AP determines if an anchor AP is available. The host AP can wait until it receives an acknowledgment from the tentative anchor AP or until a timeout occurs. If the tentative anchor acknowledges the message from the host AP, then the host AP can set it as the anchor AP. However, if the tentative anchor does not acknowledge the message, then the host AP can select one of the other candidate anchors to set as the anchor, based on the status request messages previously sent. If none of the candidate anchors are available, then no anchor AP is available and the host AP would proceed to anchor the device itself in step 410. However, if an anchor AP is available, the method then proceeds to step 420 where the host AP establishes a tunnel between itself and the anchor AP.

Once the tunnel is established between the host AP and the anchor AP, the method proceeds to step 422 where the device's data traffic is routed through the tunnel. The device is connected to its original home broadcast domain and can continue to receive data using its original IP address. In some embodiments, the data traffic sent via the tunnel is encrypted according to a key that is shared among the APs either directly or via the distributed store. In other embodiments, the APs can encapsulate packets that are sent via the tunnel such that the Ethernet frame includes a special Layer 3 Roaming (L3R) header inside of a UDP/IP packet. Thus, the packet format can be as follows: IP | UDP | L3R Header | Ethernet. Other ways to tunnel and encapsulate packets are also contemplated herein.

The L3R header can include a field that identifies the VLAN ID of the anchor AP. The L3R header can also include a flag that identifies whether the device is the source or destination MAC address in the encapsulated packet. For example, an AP may be an anchor AP for one device and a host AP for another. Thus, forwarding loops can be prevented by marking a packet as "from anchor" or "to anchor" such that the only packets an AP tunnels "to anchor" are those received from the device and packets "from anchor" are tunneled from a destination anchor to a host AP. Accordingly, an AP can determine that packets received "from anchor" are to be forwarded to the device.

In addition to routing traffic for the device, the host AP can also perform the required distributed store refresh operations, as described above. Furthermore, the host AP can send periodic anchor refresh messages to the anchor AP. In response, the anchor AP can provide the host AP with any required updates to the candidate set which the host AP is responsible for writing to the distributed store. For example, the anchor AP continues to perform broadcast domain discovery and can determine that a change has occurred to the broadcast domain. Accordingly, the identifying set and the candidate anchor set for the device will need to be updated in the distributed store. The anchor AP can communicate the information to the host AP and the host AP can periodically update the device entry in the distributed store at step 424 so that the entry does not expire. Periodic updates of the distributed store stop when the device disassociates from the host AP.

In some embodiments, the host AP can continue to monitor the candidate anchor APs after the tunnel is established with the current anchor AP. For example, the host AP can perform a periodic "ping" of the other APs in the candidate anchor set. Accordingly, the host AP can perform efficient failover operations if the present anchor AP fails to respond to a periodic anchor refresh message by quickly selecting a replacement anchor AP.

Figure 5:
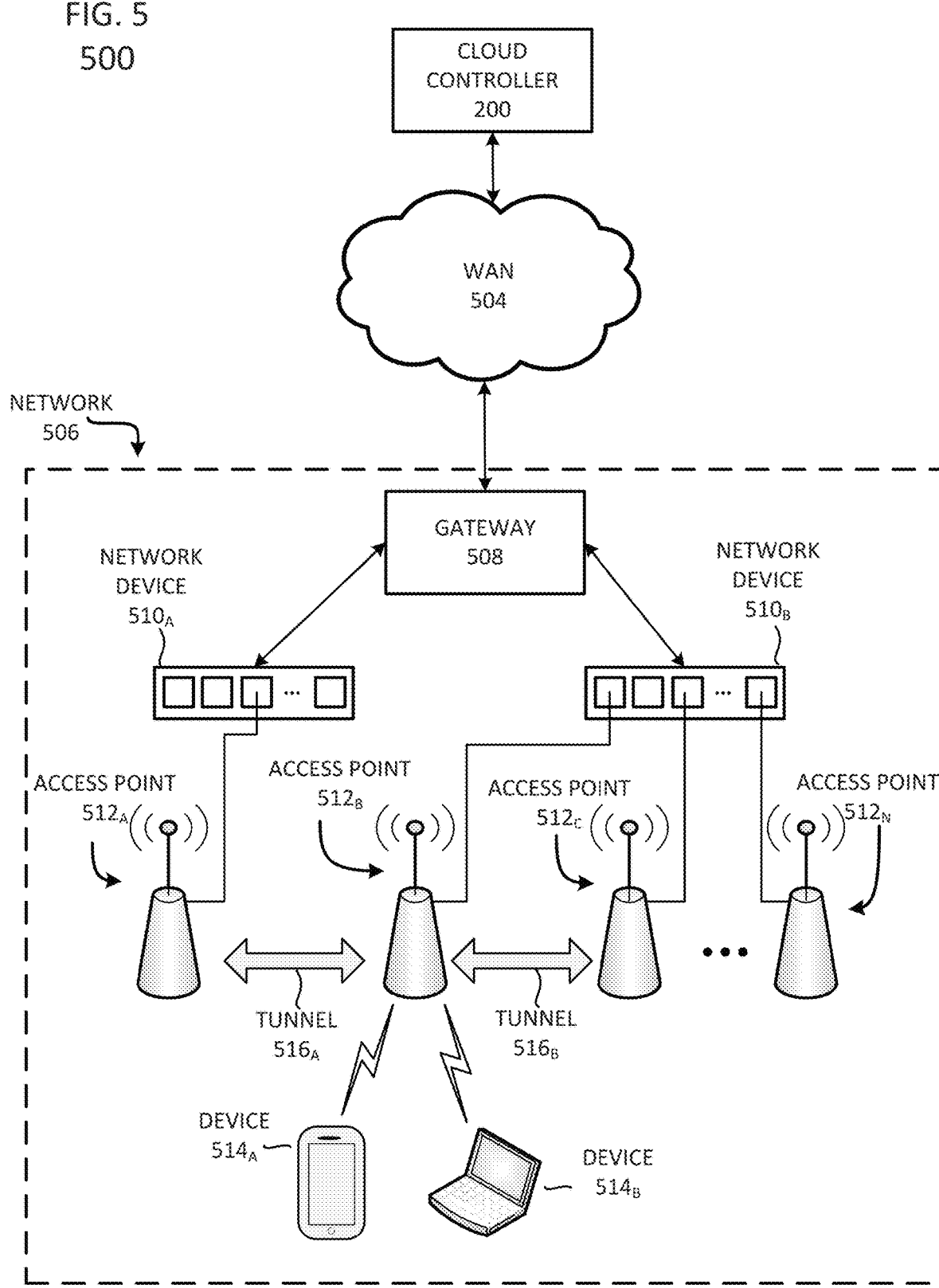
FIG. 5 illustrates an example system for implementing wireless roaming.

FIG. 5 illustrates an example system 500 used to implement wireless roaming. The system 500 can maintain L3 connectivity when a device roams across different logical network segments (e.g., VLANs and broadcast domains). The system in FIG. 5 is similar to FIG. 3 and includes device $514_A$ and device $514_B$. As illustrated, both devices are associated with AP $512_B$ which is the host AP for each. In addition, AP $512_B$ has a first tunnel $516_A$ to communicate with AP $512_A$ and a second tunnel $516_{13}$ to communicate with AP $512_C$.

AP $512_A$ is the anchor AP for device $514_A$ and AP $512_C$ is the anchor AP for device $514_B$. In one example, both device $514_A$ and $514_B$ can be in the same home broadcast domain because they each initially associated with an AP $512_N$ that was part of a particular broadcast domain. The devices can subsequently and independently roam to AP $512_B$ which can proceed to set up different anchor APs for each of the devices 514, even though they are on the same home broadcast domain. This condition can occur because the host AP randomly selects an AP from the candidate anchor list when it sets up the anchor for a device. Thus, even if the candidate anchor sets are the same, a different anchor can be selected. Furthermore, as discussed above, the candidate anchor sets can be randomly selected (AP, VID) pairs from the same broadcast domain. In that situation, it is unlikely that the devices 514 would have the same candidate anchor set although they are part of the same broadcast domain.

In this situation, because the host AP $512_B$ is hosting more than one device on the same broadcast domain, it may receive multiple copies of each broadcast message for the particular broadcast domain. To avoid receiving duplicate messages, host AP $512_B$ can designate one of the anchor APs as the broadcast anchor AP for that particular broadcast domain. For example, AP $512_B$ can designate AP $512_A$ as the broadcast anchor AP for the broadcast domain that corresponds to both devices. Thus, AP $512_C$ will not forward broadcast domain messages and AP $512_B$ can avoid receiving duplicitous messages.

In another embodiment, AP $512_B$ can determine that it is hosting multiple devices that are on the same home broadcast domain but are using separate anchor APs. In response, AP $512_B$ can reconfigure the anchor APs for one or more of the devices to avoid having separate anchor APs for the same broadcast domain. For example, the anchor for device $514_B$ can be changed to AP $512_A$ so that it matches the anchor for device $514_A$.

In the above examples, AP $512_B$ can determine that two or more devices are on the same broadcast domain by using the corresponding identifying sets from the distributed store. For example, device $514_A$ can have an entry in the distributed store that includes the identifying set for its home broadcast domain. Similarly, device $514_B$ can also have an entry in the distributed store that includes the identifying set for its home broadcast domain. As described above with respect to FIG. 4, the identifying set can be selected according to the smallest (AP, VID) pairs in the broadcast domain. Hence, device $514_A$ and device $514_B$ can have one or more common (AP, VID) pair in their identifying sets because they are part of the same broadcast domain. Thus, in one embodiment, AP $514_A$ can determine that device $514_A$ and device $514_B$ are on the same home broadcast domain by testing for an intersection among their corresponding identifying sets. Upon determining that two or more devices are part of the same home broadcast domain and are anchored to different APs, a host AP can assign a broadcast anchor AP for the particular home broadcast domain. Alternatively, a host AP can reconfigure the anchor APs for the one or more devices to avoid having multiple anchor APs for the same home broadcast domain.

Figure 6:
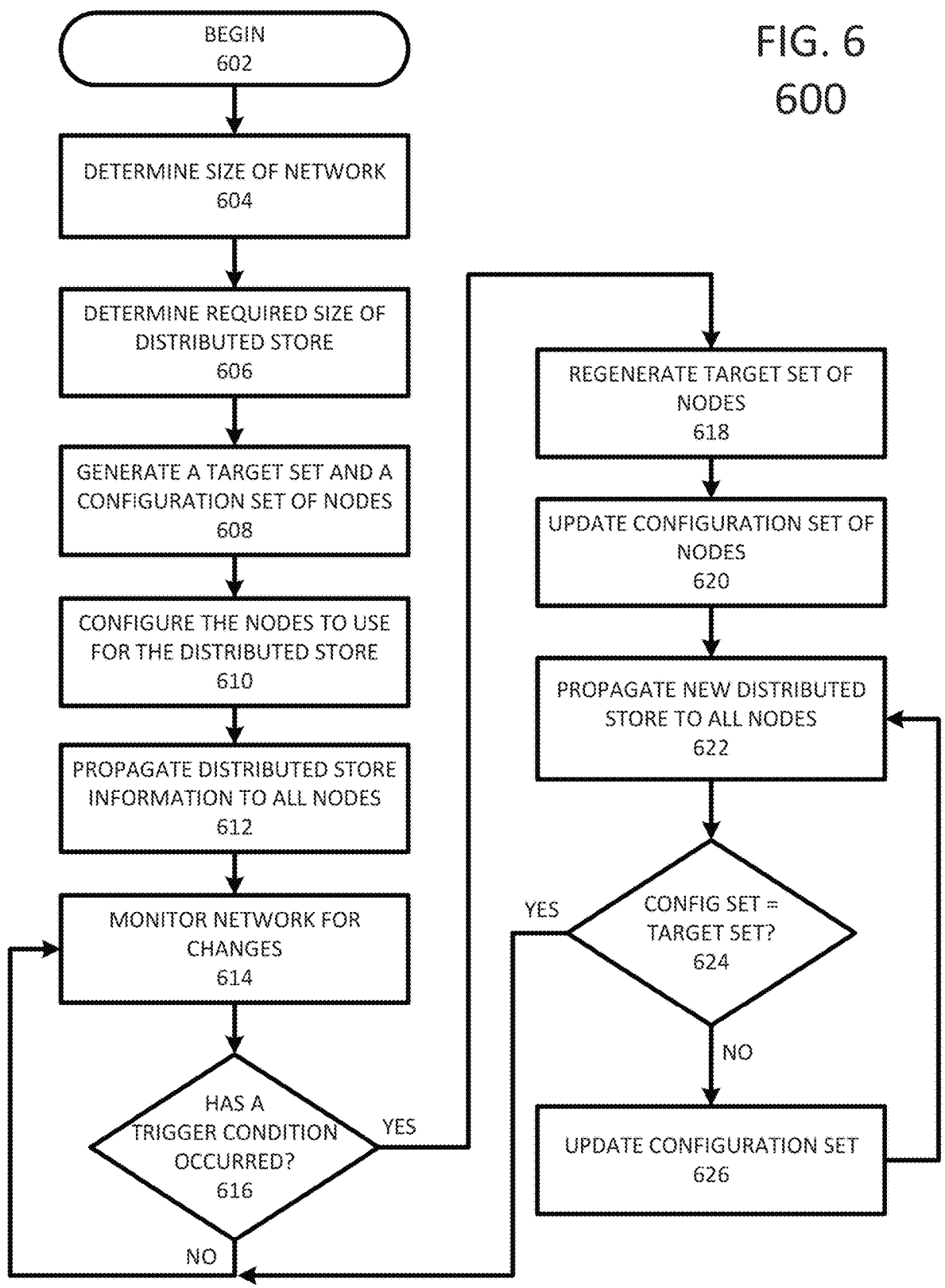
FIG. 6 illustrates an example method for configuring a distributed store for wireless roaming.

FIG. 6 illustrates an example method 600 for configuring the distributed store to perform wireless roaming. In one embodiment, method 600 can be performed by a cloud controller 200. Alternatively, method 600 may be performed by a server or other network device that resides within the network or is communicatively coupled thereto. Although the distributed store is described with respect to a wireless roaming application, those that are skilled in the art will recognize that the distributed store can be utilized for any number of applications. For example, the distributed store can be used to save information related to the RADIUS protocol and properties associated with network devices. Alternatively, the distributed store can be used to maintain network statistics and optimize network resources. Accordingly, alternative uses for the distributed store are contemplated herein.

The method begins at step 602 and continues to step 604 where the size of the network can be determined. The size of the network can be determined using a cloud controller such as the cloud controller 200 described in FIG. 2. For example, the size of the network can be determined according to the number of APs in the network. The cloud controller can provide a GUI interface or a dashboard that depicts the network configuration as well as the number of APs and their properties and positions within the network. After the size of the network is determined, the method continues to step 606 to determine the size of the distributed store.

As discussed above, the distributed store saves information about the devices that are presently associated with each of the APs in the network. Accordingly, the size of the distributed store can be related to the number of devices that the network can support. Each device has a data entry in the distributed store that is a key, value pair which includes the device MAC address and a set of identifying (AP, VID) pairs and a candidate anchor set of (AP, VID) pairs. The distributed store can also provide redundancy in the form of data replication such that it can withstand one or more failures of a particular node used to save a portion of the distributed store.

Figure 7:
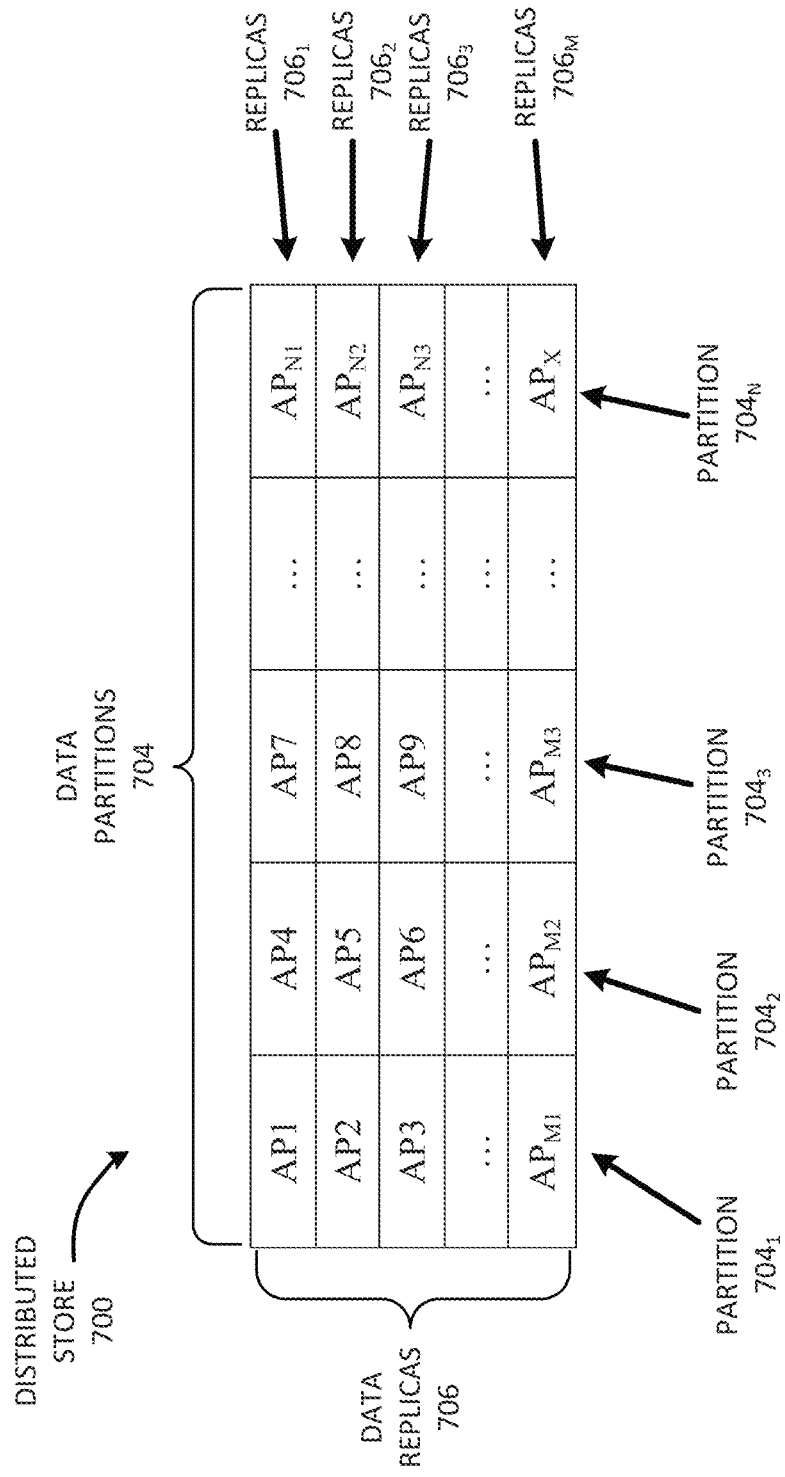
FIG. 7 illustrates an example method embodiment.

The distributed store can be represented in the form of a matrix such as the distributed store 700 depicted in FIG. 7. Each cell in the distributed store 700 corresponds to a particular node in the network that will be responsible for storing that piece of data. In some embodiments, the distributed store is saved across a subset of the access points in the network. The "key" data space along the horizontal axis can be partitioned across N number of data partitions 704. Each of the data partitions 704 can have M number of data replicas 706 along the vertical axis. As one that is skilled in the art will recognize, a larger number of data partitions 704 will allow for more efficient load distribution and a larger number of data replicas 706 will increase the redundancy in the system.

To minimize the average load per replica for a given M and N, the distributed store can be designed such that a particular AP only appears as a replica in one partition. However, in smaller networks, it may be necessary to allow a particular AP to serve as a replica in more than one partition. For smaller network sizes, the distributed store can be optimized to diversify the APs within a partition (replicas) for improved redundancy.

The key data space can be partitioned using a mod function on the N number of partitions. For example, the key can be hashed mod N in order to map it to a particular data partition. Once the appropriate partition is identified, the data is stored on all of the data replicas 706 in that partition. For instance, partition 704₁ includes data replicas for that partition that are stored on AP1, AP2 and AP3. Likewise, partition 704₂ is mapped to the second key data space and includes data replicas that are stored on AP4, AP5 and AP6.

Once the overall structure of the distributed store is determined, the method can proceed to step 608 where it generates a target set and a configuration set of nodes (APs) that can be used for the distributed store. The target set can correspond to the ideal set of APs, as determined by the cloud controller. The configuration set corresponds to the set of APs that is actually configured to perform the distributed store function. In some embodiments, the ideal set and the configuration set will be equivalent when the distributed store is initialized. Alternatively, the ideal set may be determined after the configuration set is active and the controller is able to collect statistics or metrics regarding the operation of the distributed store.

After each of the nodes is configured for use in the distributed store, the method continues to step 612 where the cloud controller propagates the information about the distributed store to all of the APs in the network. The information can include, for example, the IP addresses of each of the APs that are storing the data for a particular partition. Accordingly, when a device connects to an AP, it can map and store the data for the device to all replicas in the corresponding data partition.

Once the information about the distributed store is shared with all of the APs in the network, the APs can utilize the distributed store to perform wireless roaming. In some embodiments, the controller can continue to monitor the network to determine if the distributed store should be reconfigured or altered. For example, at step 616 the controller monitors the network for trigger conditions that can prompt a change to the distributed store. If no trigger condition is detected, the controller continues to monitor the network at 614.

A trigger condition can include a change in the network such as network growth or network reduction. For example, the initial distributed store may have been configured based on a network that had 20 APs and the network has since grown to 25 APs. The newly added APs may be located in a different geographic area, on a different/new broadcast domain, or in a new network segment. In particular, an increase in the number of network segments can make the network susceptible to alienating the distributed store replicas in the case of a switch failure because the replicas are stored on APs that are part of the original network segments. Thus, change in network size can cause a trigger to revisit the configuration of the distributed store to diversify the location (physical or virtual) of the APs participating in the distributed store. In some embodiments, the change in size to cause a trigger can be set to greater than a pre-defined threshold, such as 25%. Alternatively, the threshold can be user-configured.

Another example of a trigger condition is that a particular node in the distributed store is offline/down or has changed its IP address. Each of these conditions signifies a loss of redundancy in the distributed store and therefore requires attention. For example, if the IP address of a node has changed, the other APs will not be able to access the node to store new data or retrieve existing data.

Yet another example of a trigger condition is that the target set is smaller than the M data replicas and more nodes are now available. This will cause a trigger to reconfigure the distributed store because the original configuration does not have enough replicas to ensure proper failover functionality. The controller recognizes that the newly available nodes can remedy the situation and should be taken advantage of in order to increase the number data replicas 706.

Once a trigger condition is detected at step 616, the method continues to step 618 where it can regenerate the target set of nodes. As described above, the particular trigger condition can affect how the target set is determined. For example, significant network growth over a larger geographic area or growth in the number of network segments can trigger the generation of a new target set of nodes that adequately represents the landscape of the larger network. Alternatively, the new target set of nodes can be regenerated in a manner that is independent from the old target set.

After the new target set of nodes is generated, the method continues to step 620 where it can perform an initial update to the configuration set. For example, failed nodes and nodes that have changed IP address can be removed from the configuration set and replaced with unique nodes from the corresponding partitions in the new target set. In addition, the controller can perform updates to the configuration set such that it matches the new target set. In one embodiment, all of the nodes can be changed in a single step such that the configuration set is equivalent to the new target set. Alternatively, updates to the configuration set can be done in one or more convergence steps toward the target set of nodes per each partition. A stepwise convergence process of the configuration set toward the new target set can be used to ensure that each partition retains one or more replicas such that the data stored in the partition remains available. For instance, a subsequent convergence step can be delayed for a time that is longer than the time a host AP takes to refresh its corresponding device entries in the distributed store, thus ensuring that the AP that is introduced to the partition in the first convergence step receives updates from host APs before a second AP within the partition is removed.

For example, if the first partition in the configuration set currently utilizes AP1, AP2, and AP3 and the target set for the first partition includes AP1, AP4, and AP5, then the first convergence step could be to replace AP2 with AP4, yielding a partition of AP1, AP4, and AP3 in the configuration set. After AP4 is configured in the distributed store, a time delay can be used to allow host APs to refresh the distributed store such that AP4 is updated with the relevant partition data. After the time delay, the next convergence step can be to replace AP3 with AP5, yielding a partition in the configuration set of AP1, AP4 and AP5, which matches the desired partition in the new target set.

After updating the configuration set at 620, the method continues to step 622 where the controller can propagate the new distributed store information, i.e. the new configuration set, to all of the nodes in the network. The controller can implement the changes in the distributed store by configuring APs that are participating in the distributed store. The controller can also inform all of the APs in the network of the changes in the distributed store and of the IP addresses for the newly added APs that are part of the distributed store. A host AP that receives the new information can continue to periodically update the distributed store by writing record data to the correct nodes.

After that, the configuration (actual) set is compared to the target set at step 624. If the two sets are equivalent, then the target set has been realized and the method continues to monitor the network at step 614. Alternatively, if the two sets are not equivalent, the method continues to step 626 where it can again update the configuration set in accordance with the desired target set. As discussed above, the update to the configuration set can be made iteratively in a series of convergence steps that modify a single node in a partition at one time. After changes are made to the configuration set, the method returns to step 622 where it propagates the distributed store changes and configurations throughout the network. The aforementioned series of steps can be repeated until the desired target set is fully implemented.

While the various examples above are described in terms of specific devices, such as appliances or branches, one of ordinary skill in the art will readily recognize that the concepts described herein can apply to other devices, networks, or environments. For example, the wireless roaming concepts can apply to different network or VPN topologies, different types of devices, different protocols, different types of networks, different number of steps or items, different storage solutions, different triggering events, etc.

Example Devices

FIG. 8 illustrates an example network device 810 suitable for high availability and failover. Network device 810 includes a master central processing unit (CPU) 862, interfaces 868, and a bus 815 (e.g., a PCI bus). When acting under the control of appropriate software or firmware, the CPU 862 is responsible for executing packet management, error detection, and/or routing or forwarding functions. The CPU 862 can accomplish all these functions under the control of software including an operating system and any appropriate applications software. CPU 862 may include one or more processors 863 such as a processor from the Motorola family of microprocessors or the MIPS family of microprocessors. In an alternative embodiment, processor 863 is specially designed hardware for controlling the operations of network device 810. In a specific embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the network device 810. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 861) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 9A and FIG. 9B illustrate example system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 970 and random access memory (RAM) 975, to the processor 910. The system 900 can include a cache of high-speed memory connected directly with, in close proximity to, or integrated as part of the processor 910. The system 900 can copy data from the memory 915 and/or the storage device 930 to the cache 917 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 937, module 7 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 975, read only memory (ROM) 970, and hybrids thereof.

The storage device 930 can include software modules 937, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates an example computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that example systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
   identifying a home broadcast domain of a wireless device in response to a communication request from the wireless device received via a first access point of a plurality of access points;
   determining whether the wireless device is roaming based on a determination that a broadcast domain associated with the first access point is different than the home broadcast domain associated with the wireless device from a distributed store;
   identifying a second access point of the plurality of access points associated with the home broadcast domain of the wireless device; and
   establishing, based on the determination that the wireless device is roaming, a tunnel between the first access point and the second access point.

2. The method of claim 1, further comprising:
   routing, via the first access point, traffic associated with the wireless device through the tunnel and to the second access point.

3. The method of claim 1, wherein the distributed store comprises a distributed hash table based on at least a portion of the plurality of access points, and wherein broadcast domain information is stored at a subset of the plurality of access points.

4. The method of claim 1, further comprising:
   flooding an update to the plurality of access points indicating an association between (a) the wireless device and (b) the home broadcast domain of the wireless device and/or the broadcast domain associated with the first access point.

5. The method of claim 1, wherein the broadcast domain associated with the first access point comprises a native Virtual Local Area Network (VLAN) associated with the first access point.

6. The method of claim 5, further comprising:
   sending, via the first access point, at least one broadcast message to other access points on the broadcast domain, the at least one broadcast message having an identification of the broadcast domain.

7. The method of claim 1, further comprising:
   identifying a failure associated with the tunnel;
   sending a request to third access point on the home broadcast domain of the wireless device;
   receiving a reply from the third access point on the home broadcast domain of the wireless device; and
   establishing a second tunnel between the third access point and the first access point.

8. A system on a wireless network, the system comprising:
   a processor; and
   a non-transitory computer-readable storage medium having stored therein instructions which, when executed by the processor, cause the processor to perform operations comprising:
      identifying a home broadcast domain of a wireless device in response to a communication request from the wireless device received via a first access point of a plurality of access points;
      determining whether the wireless device is roaming based on a determination that a broadcast domain associated with the first access point is different than the home broadcast domain associated with the wireless device from a distributed store;
      identifying a second access point of the plurality of access points associated with the home broadcast domain of the wireless device; and
      establishing, based on the determination that the wireless device is roaming, a tunnel between the first access point and the second access point.

9. The system of claim 8, wherein the operations include routing traffic associated with the wireless device through the tunnel and to the second access point.

10. The system of claim 8, wherein the tunnel comprises one of a layer 2 protocol tunnel or a virtual private network tunnel.

11. The system of claim 8, wherein a network identification (ID) and/or a network tag associated with the wireless device are retrieved from the distributed store.

12. The system of claim 8, wherein the distributed store comprises a distributed hash table stored at the plurality of access points on the wireless network.

13. The system of claim 8, wherein the operations include:
    identifying a failure associated with the tunnel;
    sending a request to third access point on the home broadcast domain of the wireless device;
    receiving a reply from the third access point on the home broadcast domain of the wireless device; and
    establishing a second tunnel between the third access point and the first access point.

14. The system of claim 13, wherein the operations include routing, via the first access point, traffic associated with the wireless device through the second tunnel and to the third access point.

15. A non-transitory computer-readable storage medium having stored therein instructions which, when executed by a processor, cause the processor to perform operations comprising:
    identifying a home broadcast domain of a wireless device in response to a communication request from the wireless device received via a first access point of a plurality of access points;
    determining whether the wireless device is roaming based on a determination that a broadcast domain associated with the first access point is different than the home broadcast domain associated with the wireless device from a distributed store;
    identifying a second access point of the plurality of access points associated with the home broadcast domain of the wireless device; and
    establishing, based on the determination that the wireless device is roaming, a tunnel between the first access point and the second access point.

16. The non-transitory computer-readable storage medium of claim 15, wherein the operations include routing traffic associated with the wireless device through the tunnel and to the second access point.

17. The non-transitory computer-readable storage medium of claim 15, wherein the tunnel comprises one of a layer 2 protocol tunnel or a virtual private network tunnel.

18. The non-transitory computer-readable storage medium of claim 17, wherein a network identification (ID) and/or a network tag associated with the wireless device are retrieved from the distributed store.

19. The non-transitory computer-readable storage medium of claim 15, wherein the distributed store comprises a distributed hash table stored at the plurality of access points on a wireless network of the first access point.

20. The non-transitory computer-readable storage medium of claim 15, wherein the operations include:
    identifying a failure associated with the tunnel;

sending a request to third access point on the home broadcast domain of the wireless device;
receiving a reply from the third access point on the home broadcast domain of the wireless device; and
establishing a second tunnel between the third access point and the first access point.

* * * * *